United States Patent
Jakimov et al.

(10) Patent No.: US 10,464,170 B2
(45) Date of Patent: Nov. 5, 2019

(54) TEMPERATURE REGULATION FOR A DEVICE FOR THE ADDITIVE MANUFACTURING OF COMPONENTS AND CORRESPONDING PRODUCTION METHOD

(71) Applicant: MTU Aero Engines AG, Munich (DE)

(72) Inventors: Andreas Jakimov, Munich (DE); Herbert Hanrieder, Hohenkammer (DE)

(73) Assignee: MTU Aero Engines AG, Munich (DE)

( * ) Notice: Subject to any disclaimer, the term of this patent is extended or adjusted under 35 U.S.C. 154(b) by 1063 days.

(21) Appl. No.: 14/782,486

(22) PCT Filed: Feb. 27, 2014

(86) PCT No.: PCT/EP2014/000512
§ 371 (c)(1),
(2) Date: Oct. 5, 2015

(87) PCT Pub. No.: WO2014/166567
PCT Pub. Date: Oct. 16, 2014

(65) Prior Publication Data
US 2016/0074965 A1    Mar. 17, 2016

(30) Foreign Application Priority Data
Apr. 8, 2013  (EP) ..................... 13162645

(51) Int. Cl.
*B23K 9/04*     (2006.01)
*B23K 26/342*   (2014.01)
(Continued)

(52) U.S. Cl.
CPC .......... *B23K 26/342* (2015.10); *B22F 3/1055* (2013.01); *B23K 26/032* (2013.01);
(Continued)

(58) Field of Classification Search
CPC ................ B22F 2999/00; B22F 3/1055; B22F 2003/1056; B22F 2003/1057;
(Continued)

(56) References Cited

U.S. PATENT DOCUMENTS

2011/0042031 A1   2/2011  Furlong et al.
2013/0309420 A1*  11/2013 Flesch .................. B22F 3/1055
                                              427/591

FOREIGN PATENT DOCUMENTS

CN      102179517 A  *  9/2011
CN      102179517 A     9/2011
(Continued)

*Primary Examiner* — Dana Ross
*Assistant Examiner* — Joseph W Iskra
(74) *Attorney, Agent, or Firm* — Barlow, Josephs & Holmes, Ltd.

(57) ABSTRACT

The present invention relates to a device for the additive manufacturing of components by selectively irradiating a powder bed, the device having a working chamber in which at least one powder bed chamber and at least one radiation source are arranged such that the radiation source can irradiate a powder in the powder bed chamber, and wherein the device comprises at least one induction coil such that the powder bed and/or a component, which is generated by irradiating the powder bed, can be at least partially inductively heated.

11 Claims, 3 Drawing Sheets

(51) Int. Cl.
    *B23K 26/03*          (2006.01)
    *B22F 3/105*         (2006.01)
    *B33Y 30/00*         (2015.01)
    *H05B 6/06*          (2006.01)
    *H05B 6/10*          (2006.01)
    *H05B 6/40*          (2006.01)
    *H05B 6/44*          (2006.01)

(52) U.S. Cl.
    CPC ............ *B23K 26/034* (2013.01); *B33Y 30/00* (2014.12); *H05B 6/06* (2013.01); *H05B 6/101* (2013.01); *H05B 6/40* (2013.01); *H05B 6/44* (2013.01); *B22F 2003/1056* (2013.01)

(58) Field of Classification Search
    CPC ............ B23K 2101/001; B23K 26/032; B23K 26/034; B23K 26/342; B29C 64/153; B33Y 30/00; B33Y 50/02; H05B 6/06; H05B 6/101; H05B 6/40; H05B 6/44; Y02P 10/295
    See application file for complete search history.

(56) References Cited

FOREIGN PATENT DOCUMENTS

| | | | | |
|---|---|---|---|---|
| DE | 102006058949 A1 | 6/2008 | | |
| DE | 102009051479 A1 | 5/2011 | | |
| EP | 2359964 A1 | 8/2011 | | |
| WO | 2008071165 A1 | 6/2008 | | |
| WO | 2013152751 A1 | 10/2013 | | |
| WO | WO-2014074947 A2 * | 5/2014 | ............ | B22F 3/1055 |

\* cited by examiner

TEMPERATURE REGULATION FOR A DEVICE FOR THE ADDITIVE MANUFACTURING OF COMPONENTS AND CORRESPONDING PRODUCTION METHOD

BACKGROUND OF THE INVENTION

Field of the Invention

The present invention relates to a method and a device for producing components by an additive or generative manufacturing method, in particular a method by means of selective irradiation of a powder bed.

Prior Art

Known from the prior art are additive manufacturing methods for the rapid production of prototypes or for the manufacture of components that are difficult to produce using other methods. Methods such as selective laser melting (SLM), direct metal laser sintering (DMLS), or electron beam methods, among others, are employed for this purpose. Also known from the prior art are, in particular, additive manufacturing methods for the production of components of a turbomachine, such as, for example, components of an aircraft engine or a gas turbine—for example, the method described in DE 10 2009 051 479 A1 or a corresponding device for the production of a component of a turbomachine.

In this method, a corresponding component is produced by deposition of at least one powdered component material layer by layer on a component platform in the region of a buildup and joining zone as well as layer-by-layer and local melting or sintering of the component material by means of energy supplied to the buildup and joining zone. The energy in this case is supplied via laser beams, such as, for example $CO_2$ lasers, Nd:YAG lasers, or Yb fiber lasers as well as diode lasers, or by way of electron beams. In the method described in DE 10 2009 051 479 A1, furthermore, the generated component or the buildup and joining zone is heated to a temperature just below the melting point of the component material by means of a zone oven in order to maintain a directionally solidified and single-crystalline crystal structure.

Known from DE 10 2006 058 949 A1 is also a device and a method for the rapid manufacture and repair of blade tips of blades of a gas turbine, in particular an aircraft engine, wherein inductive heating is employed together with laser or electron beam sintering.

Inductive heating of the component to be produced in conjunction with additive manufacturing of a component by way of selective laser melting is also described in EP 2 359 964 A1.

WO 2008/071165 A1 describes, in turn, a device and a method for the repair of turbine blades of gas turbines by means of powder deposition welding, wherein a radiation source, such as a laser or an electron beam, finds use for deposition welding. At the same time, a heating device for heating the blade to be repaired is provided by way of an induction coil.

Although, in an additive manufacturing method in which powder particles are melted or sintered by means of irradiation to form a component, it is thus known from prior art additionally to provide heating of the component and to implement this additional heating by means of inductive heating, there are still problems involved in employing additive manufacturing methods of this type for high-temperature alloys, which cannot be melted or welded, because, in the case of such types of alloys, unacceptable hot cracks often occur.

BRIEF SUMMARY OF THE INVENTION

Object of the Invention

The object of the present invention is therefore to provide a method and a device for the additive manufacturing of components, in which the formation of cracks can be prevented in an effective way during manufacture. At the same time, the device should have a simple design and it should be possible to carry out the method in a simple manner, but as rapidly and as efficiently as possible.

Technical Solution

This object is achieved by a device and a method of the present invention. Advantageous embodiments are discussed in detail below.

To solve the above-mentioned problem and in particular to prevent cracks, the present invention proposes to provide inductive heating that is adapted locally and individually to the component geometry, said inductive heating enabling a specific temperature adjustment on the basis of a temperature measurement by way of a defined temperature monitoring and control of the operating parameters, so as to perform any necessary heating of the component in a defined way. Proposed for this purpose is a device in which at least one induction coil can be moved or positioned relative to one or a plurality of powder bed chambers, in which the powder bed is provided for the additive manufacturing of the component. The ability of the induction coil to move relative to the powder bed chamber can be brought about either by movement of the induction coil or by movement of the powder bed chamber.

Moreover, a temperature measurement device for measuring the temperature at at least one point of the powder bed and/or of the component to be generated as well as a regulating device for regulating the operating parameters of the induction coil and/or the radiation source is provided, wherein the regulating device receives as a control variable the temperature measured by the temperature measurement device. Provision of the temperature measurement device and the regulating device enables desired temperature conditions to be adjusted, because the regulating device alters the operating parameters of the induction coil and/or the radiation source when the measured temperature deviates from the preset temperature. Operating parameters of the induction coil and/or the radiation source are understood to refer to both the positioning of the induction coil and/or the beam of the radiation source as well as other operating parameters, such as, for example, the power input of corresponding components or the like.

The device is set up in this case in such a way that the temperature measurement occurs at at least one measurement point, which is fixed at least with respect to one spatial direction relative to the position of the induction coil and/or the beam of the radiation device, so as to adjust constant conditions with respect to the melting region. In this way, it is possible in a defined way to adjust the desired temperatures in the melting region as well as in the region of the powder that has not yet melted or in the region of the already resolidified melt and thus correspondingly to adjust locally defined temperature gradients, which make possible a reliable and damage-free solidification even of alloys that are difficult to melt or weld, such as, for example, high-temperature alloys. At the same time, it can be assured that the processing speed achieved is as high as possible.

A thermal imaging camera can be employed as the temperature measurement device, in which the temperature can be determined from the thermal image at defined points. In order to be able to carry out an unvarying determination of the temperature in relation to the position of the induction coils and/or the beam of the radiation source, the position of the induction coil and/or the beam of the radiation source can be transmitted to an analysis unit of the thermal imaging camera, so that the measured temperature value can be determined in relation to the correct position with respect to the induction coil and/or the beam of the radiation source.

Induction coil is understood in the context of the present invention to refer to any device that can produce inductive heating, that is, for example, independent of the number of windings, so that the induction coil may also be referred to, for example, as an induction loop.

The present invention, that is, the arrangement of induction coils that can move relative to one or a plurality of powder bed chambers, can be employed in various devices and methods for the additive manufacturing of components from a powder, such as, for example, in the initially described methods and devices for selective laser melting (SLM) or for direct metal laser sintering (DLS) or corresponding electron beam methods. Correspondingly, the radiation source of the device for additive manufacturing of components can be any radiation source suitable for this purpose.

The device for the additive manufacturing of components can be designed in such a way that the one or plurality of induction coils can be arranged in different positions relative to the powder bed chamber or powder bed chambers. These can be defined positions at specific distances from one another, or the induction coil(s) can be moved and positioned in a continuous manner.

The induction coil can be arranged in any suitable position in which an inductive heating of the component to be additively manufactured can be implemented. In particular, each induction coil can be arranged above and/or on the side of the powder chamber bed(s).

According to one embodiment, the induction coil in one or in a plurality of induction coils can be displaced in a plurality of offset planes, for example, along a rail arrangement or along two rail arrangements that are arranged crosswise with respect to each other, so that the induction coil(s) can each be arranged in a plane in various positions, with the planes being parallel to a surface area of the powder bed chamber, in which the powder is bonded by radiation to form a component. Because, in the additive manufacturing of components from a powder, the component is formed layer by layer, the suitable positioning of the induction coil(s) in a plane parallel to the surface area in which the layer is deposited enables a suitable position of the induction coil(s) to be chosen depending on the geometry of the component layer. In particular, it is possible in this way for the inductive heating to take into account any alteration of component geometry during the formation process. Thus, for example, the cross section of the component in the buildup direction can be considerably varied, that is, for example, enlarged or reduced in size, so that the component geometry can be followed by a movement of the induction coil(s) and hence an exact and accurate inductive heating of the component can be achieved.

Moreover, however, it is also possible to design the induction coil(s) in such a way that they can be adjusted in a direction transverse to the surface area of the powder bed chamber, in which the powder is bonded by irradiation to form a component, so that, by variation of the distance from the component to be generated, the heating can be controlled using the induction coil.

As already mentioned, it is possible to provide only a single induction coil at one powder bed chamber or else a plurality of induction coils can be assigned to one powder bed chamber. Moreover, because a plurality of powder bed chambers can be arranged in a working chamber, it is possible to employ a plurality of induction coils, which can be positioned with respect to various powder bed chambers or else with respect to a single powder bed chamber. In doing so, the induction coils can be positioned independently of one another. Only potential collisions of induction coils with one another limit the individual ability of an induction coil to move in this case.

In particular, two induction coils that are arranged crosswise with respect to each other can be operated, with it being possible, in particular, to provide the beam of the radiation source for melting the powder in the region of intersection.

The induction coils and/or the beam of the radiation source can be controlled or regulated independently of each other on the basis of the measurement results of one or a plurality of temperature measurement devices. However, a combined regulation that takes into account the ways in which the other respective components act is advantageous in order to make it possible to adjust optimally the temperature by way of a coordinated operation of the induction coils and/or the radiation source.

The proposed fixing of a temperature measurement point with respect to an induction coil and/or with respect to the beam of the radiation course, so as to achieve defined temperature conditions, can be implemented for one respective measurement point or for a plurality of measurement points per induction coil or beam, and/or a temperature measurement point can be fixed with respect to a plurality of components, such as the induction coils and the beam for the radiation source, with it being possible for the fixation to occur with respect to different spatial directions, for example. Thus, for example, a first temperature measurement point with respect to the X direction of a first induction coil as well as simultaneously with respect to the Y axis of a second induction coil can be fixed, while a second temperature measurement point is fixed with respect to the second induction coil and the Y direction of the first induction coil. Obviously, however, a temperature measurement point with respect to a plurality of spatial directions, in particular independent spatial directions, in relation to an induction coil or to the beam of the radiation source can be fixed.

A plurality of temperature measurement points can be used for the temperature regulation, with it being possible for one measurement point to include the preheating of the powder, for example, while another measurement point can include and regulate the thermal post-treatment of the already solidified component.

In the additive manufacturing of a component, the described device enables the position of one or a plurality of induction coils for inductive heating of the component to be determined individually in accordance with the component geometry to be generated and/or a determined temperature and to be appropriately adjusted. In addition, the power of the induction coils can be controlled and/or regulated in an appropriate way by adjusting, for example, the frequency with which the induction coils are operated. As a result, a very exact and defined temperature adjustment for the additively manufactured component is possible and corresponding crack formations in components can be prevented, in particular when they are to be produced from materials that are susceptible to crack formation.

BRIEF DESCRIPTION OF THE FIGURES

The attached drawings show in a purely schematic way in

DETAILED DESCRIPTION OF THE INVENTION

Additional advantages, characteristics, and features of the present invention will be become clear in the following detailed description of exemplary embodiments on the basis of the attached figures. However, the invention is not limited to these exemplary embodiments.

Figure 1:
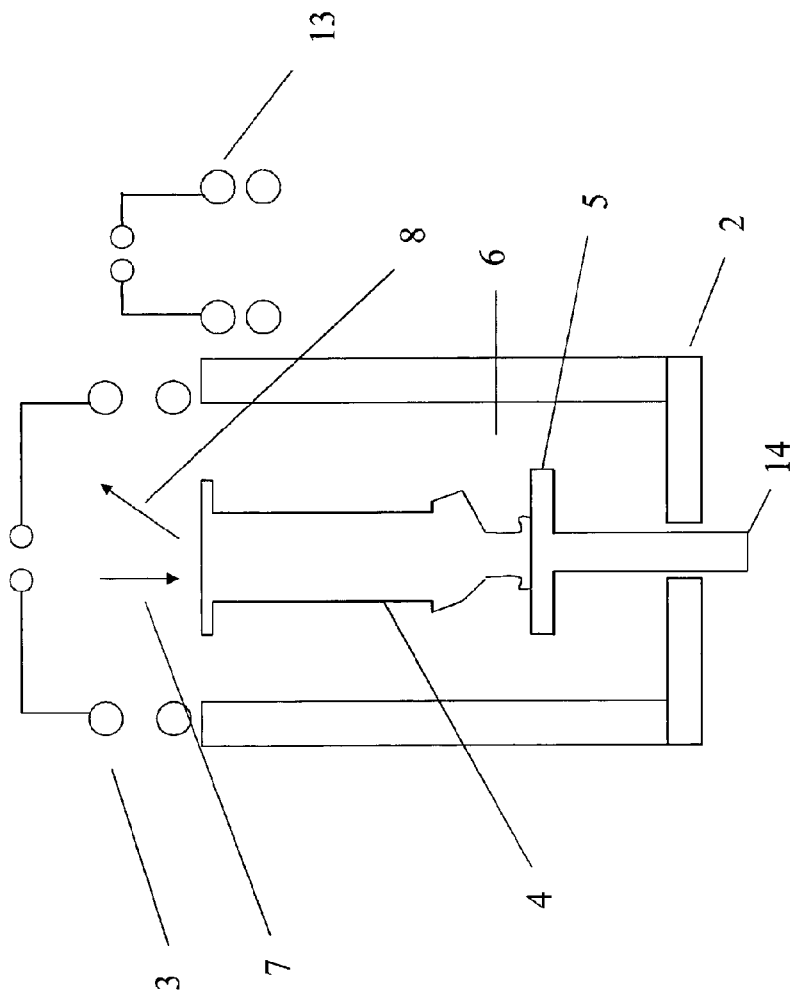
FIG. 1 a cross-sectional view through a powder bed chamber of a processing chamber of a device according to the invention.

FIG. 1 shows a cross section through a powder bed chamber 2, in which, for example, a single turbine blade 4 is produced. The powder bed chamber 2 is essentially designed as a vessel, in which a platform 5 is arranged that can be displaced by means of a piston 14. Powder is provided in the powder bed chamber 2 above the platform 5 and is disposed initially in the upper region of the powder bed chamber 2, so that, there, a laser beam 7 can melt the powder present on the platform 5, whereby a cross-sectional region of a corresponding component is formed after solidification of the melted powder. By lowering the platform 5 incrementally in steps and overfilling with powder 6 as well as by melting the powder layer by layer in accordance with the contour to be created, the turbine blade 4 is produced step by step.

In order to prevent cracks or the like during manufacture, the partially produced turbine blade 4 is inductively heated or kept at its temperature or is cooled in a slow and controlled manner (post-heating) in the region of the already melted and, if appropriate, already solidified material. For this purpose, two induction coils 3, 13 are used, which are arranged above and/or on the side of the component or the turbine blade. In addition, the induction coils can be employed for preheating the powder, so that the laser beam 7 need bring about only slight heating until melting occurs.

A pyrometer or a thermal imaging camera, which detects the thermal radiation 8 and is correspondingly able to determine the temperature, is employed for monitoring the preheating temperature and/or the post-heating temperature.

In order to make possible an exact temperature control, the control or regulation of the induction coils 3, 13 can be performed by means of the detected temperature as a control or regulating variable and namely can be done so in relation to the position in which the coils are arranged and/or the power with which the coils are operated. For this purpose, a corresponding control or regulation, preferably based on a data processing unit with appropriate software, can be provided.

Moreover, the positioning of the induction coils 3, 13 can be predetermined as a function of the component geometry to be produced. Because the component geometry can change during the manufacturing process, the positions of the induction coils 3, 13 can also be correspondingly altered.

Figure 2:
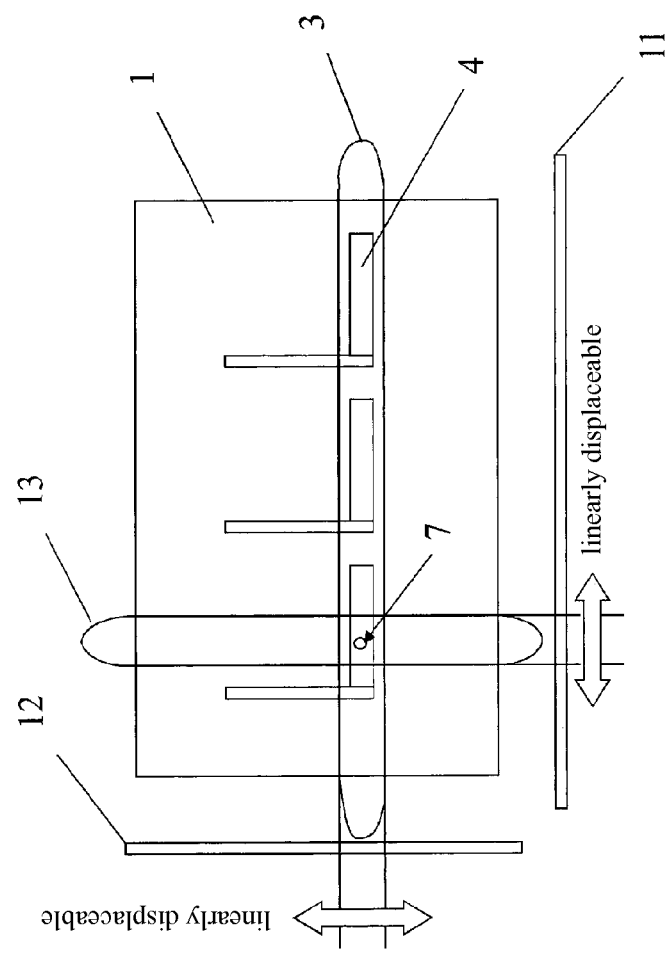
FIG. 2 a plan view on another device according to the invention with a total of three powder bed chambers for parallel production of three components and two displaceable coils.

FIG. 2 shows a plan view on another embodiment of a device according to the invention, which can be designed at least in part identically to the embodiment of FIG. 1 or identically in at least parts thereof. In the embodiment of FIG. 2, three components 4 are produced in parallel in a working chamber 1. The corresponding powder bed chambers are not depicted explicitly in FIG. 2.

The device according to FIG. 2 comprises two coils 3, 13, which can be displaced linearly along the rail arrangements 11, 12. The coils 3, 13 extend in this case over the entire width or length of the working chamber 1 and can thus cover all regions for the production of components 4. Alternatively, it is also conceivable to design the coils 3, 13 to be smaller, so that they cover only a subregion of the working chamber 1, with, instead, it being possible additionally to provide for a respective linear displacement crosswise to the respective rail arrangements 11, 12, so as to be able to position the coils 3, 13 at any position of the working chamber 1.

In a purely schematic manner, FIG. 2 shows with the laser beam 7, which is directed from above onto the component 4 to be generated, how the laser beam can be displaced over the working chamber 1 in order to generate the component 4. In order to prevent any shading of the laser beam 7, the coils 3, 13 can also be moved in accordance with the movement of the laser beam 7; in particular, they can moved briefly out of the working region of the laser beam 7.

The coils 3, 13 can be displaced along the rails 11, 12 in one plane or in two mutually offset planes, which are directed essentially parallel to the surface area in which the powder is melted by the laser beam 7. The laser beam 7 can be provided in the region of intersection of the coils 3, 13, in particular, so that, on the one hand, the powder that has not yet melted is preheated by the induction coils 3, 13, and the melts that have already solidified to form the component can be subjected to a thermal post-treatment. Since the induction coils 3, 13 can be displaced and since the laser beam 7 can be displaced and directed correspondingly, all regions of a working chamber 1 with the powder bed chambers 2 can be reached, so that any components 4 can be generated and appropriately treated.

Figure 3:
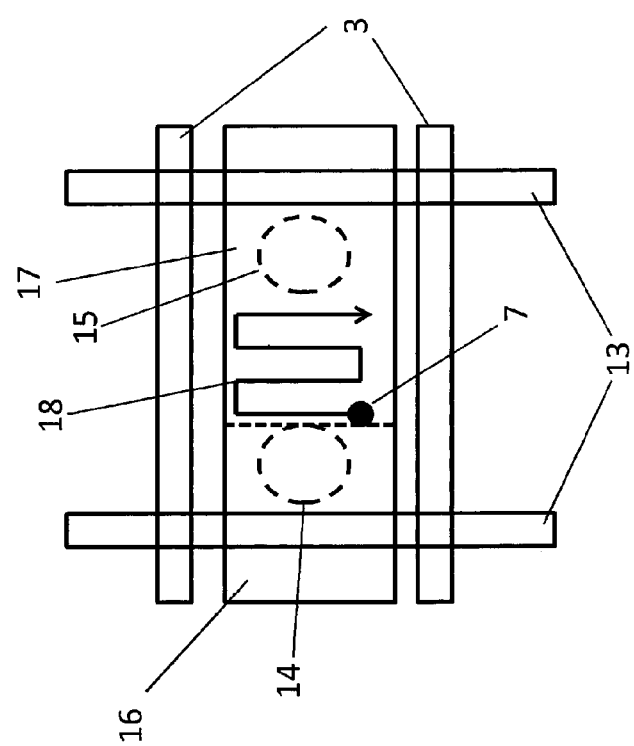
FIG. 3 a detail view of the processing region from FIG. 2.

FIG. 3 shows a cutout of FIG. 2 in greater detail, in which, in particular, the region of intersection of the induction coils 3, 13 is shown.

The laser beam 7 is arranged within the region of intersection and is moved along a meandering laser track 18 over the powder bed in order to melt the powder. Once the laser beam 7 has moved further along, following the laser track 18, the melt solidifies once again in order to form the component to be generated. The solidified region 16 is depicted in FIG. 3 in the left part of the figure. Correspondingly, the loose powder, which is arranged on the underlying, already generated component 4, for formation of the next layer, is depicted in the right part of FIG. 3 and is identified there by the reference number 17 for the powder region.

A temperature measurement point 14, 15 is assigned to each of the induction coils 3, 13, with the first temperature measurement point 14 being disposed in the region 16 of the solidified melt, while the second temperature measurement point 15 is provided in the powder region 17. When the laser beam 7 moves along the laser path 18 over the working surface, the induction coils 3, 13 can also be moved in order to essentially maintain the arrangement with respect to the laser beam 7. However, it is not necessary to translate each movement of the laser beam 7 into a corresponding movement of the induction coils 3, 13; it suffices, for example, when the laser beam 7 remains within the region of intersection of the induction coils 3, 13. In the exemplary embodiment shown, this means that, although the laser beam 7 moves along the laser path 18 in a oscillatory manner upward and downward in the illustration of FIG. 3, it does not leave the region of intersection of the induction coils 3, 13 during this movement. The induction coil 3 can insofar be kept fixed in place. However, the laser beam 7 moves along the laser path 18 in the illustration of FIG. 3 from left to right, so that the induction coil 13 is also moved to the right with increasing movement of the laser beam 7 to the right. At the same time, the temperature measurement points 14, 15 carry out a movement to the right corresponding to the movement of the induction coil 13, whereas, in a perpendicular direction to this, that is, upward or downward, in the illustration of FIG. 3, the temperature measurement points 14, 15 remain stationary with respect to the induction coil 3. Correspondingly, in the embodiment shown, the two temperature measurement points 14, 15 are each fixed in one direction with respect to the respective coil 3, 13. In the direction that goes from left to right or vice versa in FIG. 3, the temperature measurement points 14, 15 are fixed with respect to the induction coil 13, whereas, in a perpendicular direction to it, that is, in a direction upward or downward or vice versa in FIG. 3, the temperature measurement points 14, 15 are fixed with respect to the induction coil 3. As a result, it is possible to achieve constant induction conditions with advance of the solidification front, so that constant melt conditions with defined, local temperature gradients can be adjusted at high production speeds and it is simultaneously possible to prevent the formation of cracks and the like during solidification.

Although the present invention has been described on the basis of the exemplary embodiment, it is obvious to the person skilled in the art that the invention is not limited to this exemplary embodiment, but instead changes or additions are possible in such a way that individual features can be omitted or different combinations of features can be implemented, without departing from the protective scope of the attached claims. The present invention comprises, in particular, all combinations of all individual features presented.

The invention claimed is:

1. A device for the additive manufacturing of components by selectively irradiating a powder bed,
   wherein the device has a working chamber, in which at least one powder bed and at least one radiation source are arranged such that the radiation source can irradiate a powder on the powder bed,
   wherein the device comprises a plurality of induction coils, which move independently of one another relative to the other of the plurality of induction coils, the plurality of induction coils can be displaced in one or a plurality of planes that are parallel to a surface area of the powder bed, in which the powder is bonded by irradiation to form a component, and a first induction coil can be displaced along a first spatial direction and a second induction coil can be displaced along a second spatial direction, which is independent of the first spatial direction, so that the at least one powder bed and/or a component, which is generated by irradiation of the powder bed, is at least partially inductively heated, and
   wherein the induction coil can be displaced relative to the at least one powder bed and the device further comprises a temperature measurement device for measuring a temperature at at least one point of the at least one powder bed and/or the component to be generated, and a regulating device for regulating operating parameters of the plurality of induction coils and/or the radiation source, wherein the regulating device receives the temperature measured by the temperature measurement device as a control variable and the temperature measurement device is designed such that the at least one measurement point is fixed relative to the position of the plurality of induction coils and/or the beam of the radiation source at least with respect to one spatial direction.

2. The device according to claim 1,
   wherein the temperature measurement device comprises a thermal imaging camera.

3. The device according to claim 1,
   wherein the plurality of induction coils arranged above and/or on the side of the at least one powder bed in various positions.

4. The device according to claim 1, wherein
   the plurality of induction coils can be displaced in their position in a direction crosswise to a surface area of the at least one powder bed, in which the powder is bonded by irradiation to form a component.

5. The device according to claim 1, wherein
   the plurality of induction coils are arranged with respect to two induction coils in crosswise form.

6. The device according to claim 1, wherein
   each of the plurality of induction coils and/or each radiation source are controlled independently of the other by the regulating device.

7. The device according to claim 1, wherein
   at least one measurement point is assigned to each induction coil and/or one measurement point is assigned to the plurality of induction coils.

8. The device according to claim 1, which comprises the selective irradiation of a powder bed with a radiation source, wherein the produced component and/or the at least one powder bed is/are simultaneously inductively heated, wherein,
   starting from the geometry of the component to be generated, the position of one of or a plurality of the plurality of induction coils is determined and adjusted for the inductive heating and at at least one point, which is fixed relative to the plurality of induction coils and/or the beam of the radiation source with respect to at least one spatial direction, the temperature of the powder bed and/or the generated component is measured, by means of which the operating parameters of the induction coil and/or the radiation source are controlled.

9. The device according to claim 8, wherein
   the position of the plurality of induction coils are adjusted as a function of the position of the beam of the radiation source and/or the measured temperature.

10. The device according to claim 8, wherein
    one induction coil is used for preheating the component and another induction coil is used for post-heating the generated component.

11. The device according to claim 8, wherein
    the temperature is determined for each induction coil at at least one measurement point assigned to the induction coil.

* * * * *